(12) United States Patent
Zanier et al.

(10) Patent No.: US 6,247,244 B1
(45) Date of Patent: Jun. 19, 2001

(54) DEVICE FOR LONGITUDINAL MEASUREMENT

(75) Inventors: Adriano Zanier, Prilly; Arthur Bovey, Lausanne; Michel Paudex, Chavannes-Renens, all of (CH)

(73) Assignee: Brown & Sharpe Tesa SA, Renens (CH)

( * ) Notice: Subject to any disclaimer, the term of this patent is extended or adjusted under 35 U.S.C. 154(b) by 0 days.

(21) Appl. No.: 09/352,940

(22) Filed: Jul. 14, 1999

(30) Foreign Application Priority Data

Jul. 16, 1998 (EP) .................................................. 98810680

(51) Int. Cl.$^7$ ...................................................... G01B 3/18
(52) U.S. Cl. ................................................ 33/819; 33/784
(58) Field of Search .............................. 33/783, 784, 792, 33/793, 794, 795, 796, 806, 813, 814, 816, 817, 819, 820, 831, 821, 822, 823, 826, 827

(56) References Cited

U.S. PATENT DOCUMENTS

| | | | |
|---|---|---|---|
| 1,098,694 | * 2/1914 | Starrett | 33/817 |
| 2,212,910 | * 8/1940 | Witchger | 33/817 |
| 2,325,351 | * 1/1943 | Willis | 33/816 |
| 2,467,499 | * 4/1949 | Sachtleber | 33/816 |
| 2,555,243 | * 5/1951 | Parker | 33/813 |
| 2,563,061 | * 8/1951 | Parker | 33/816 |
| 2,871,571 | * 2/1959 | Metevia | 33/816 |
| 3,131,482 | * 5/1964 | Watelet et al. | 33/816 |
| 3,667,127 | * 6/1972 | Tsugami | 33/819 |
| 3,686,766 | * 8/1972 | Matumoto | 33/819 |
| 3,758,956 | * 9/1973 | Nakata | 33/816 |
| 3,835,544 | 9/1974 | Schneider | 33/147 |
| 3,877,149 | 4/1975 | Masuda | 33/166 |
| 4,255,861 | * 3/1981 | Nakata et al. | 33/819 |
| 4,268,969 | 5/1981 | Koenuma | 33/438 |
| 4,561,185 | * 12/1985 | Sakata et al. | 33/817 |
| 5,433,016 | * 7/1995 | Tachikake et al. | 33/820 |
| 5,495,677 | * 3/1996 | Tachikake et al. | 33/819 |
| 5,829,155 | * 11/1998 | Takahashi et al. | 33/813 |

FOREIGN PATENT DOCUMENTS

| | | |
|---|---|---|
| 2657651 | 6/1977 | (DE) . |
| 0791801 | 8/1997 | (DE) . |
| 2356120 | 1/1978 | (FR) . |
| 0538184 | 4/1993 | (FR) . |
| 1230417 | 5/1971 | (GB) . |
| 1361991 | 7/1974 | (GB) . |

OTHER PUBLICATIONS

Patent Abstracts of Japan, vol. 14, No. 430, Sep. 14, 1990 and JP 02 167425A (Mutoh Ind Ltd), Jun. 27, 1990.

* cited by examiner

*Primary Examiner*—Jacob K. Ackun, Jr.
*Assistant Examiner*—F. Francis
(74) *Attorney, Agent, or Firm*—Jacobson Holman, PLLC

(57) ABSTRACT

The micrometer includes a sleeve provided with an at least partially threaded inner surface and an at least partially threaded outer surface. The outer surface includes at least one deformable, tapered portion. A micrometric screw is engaged in the sleeve, and is able to be set in rotation with respect to the sleeve in such a way as to displace itself along the longitudinal measuring axis (x) of the device. A nut is engaged on the external threading of the sleeve and is able to be put in contact with the tapered portion in such a way as to deform it in order to adjust the play between the screw and the sleeve. The tapered portion is devoid of longitudinal slits; its deformability is provided by an external diameter variable along its periphery, preferably by an odd number of flat segments.

10 Claims, 6 Drawing Sheets

DEVICE FOR LONGITUDINAL MEASUREMENT

This invention concerns a device for longitudinal measurement, for example a micrometer, and more particularly a micrometer comprising a threaded screw engaged in a fixed sleeve and having means of adjustment of the play between the sleeve and the screw. The present invention also relates to an electronic micrometer comprising a fixed transducer facing the scale.

U.S. Pat. No. 5,433,016 describes a conventional electronic micrometer. This micrometer comprises a micrometric screw engaged in a threaded sleeve integral with the anvil of the micrometer. By turning the micrometric screw by means of the thimble of the micrometer, the screw is thus displaced longitudinally with respect to the anvil. A system of capacitive measurement measures the number of rotations made by the micrometric screw and thus allows the distance between the free end of the latter and the anvil to be determined.

In order to measure distances with optimal precision and resolution, on the order of one micron, it is necessary to reduce as much as possible the mechanical play between the micrometric screw and the fixed sleeve. With this aim, a portion of the sleeve is tapered and is provided with a plurality of longitudinal slits. In order to adjust the play, a nut is screwed onto this portion of the sleeve. By tightening the nut more, its point of contact with the tapered portion of the sleeve is changed, which causes a deformation of the latter at the level of the slits and a reduction in the diameter of the sleeve, in such a way as to compensate the play with the screw.

By tightening the external nut, however, the inner threading of the sleeve the level of the slits is also deformed. Moreover, the deformations of the sleeve are concentrated in the region of the slits so that the compressed sleeve is no longer perfectly circular and a smooth displacement of the micrometric screw is not guaranteed. It is therefore necessary to bore and tap the sleeve simultaneously with the external nut slightly with restraint. This adjustment operation must be done manually, during assembly of the micrometer, by means of a specially manufactured boring and tapping tool. The result is not always guaranteed, and it is sometimes necessary to repeat the operation several time Furthermore the machining of the slits and the tapping produce burrs which are difficult to eliminate completely and which are liable to disturb the functioning of the micrometer.

The U.S. Pat. No. 3,877,149 describes a micrometer in which the play between the sleeve and the micrometric screw is adjusted by means of a pin pressed at a point on the periphery of the sleeve. The pressure between the sleeve and the micrometric screw is adjusted only locally at the point of contact between the pin and the sleeve so that the deformation of the sleeve is very great in this device.

The British patent GB 1 361 991 describes a micrometer employing a threaded piece of synthetic material deformable by compression to compensate the play with the micrometric screw. A threaded piece of synthetic material, however, is difficult to machine with great precision and moreover liable to wear out quickly. This construction is thus unsuitable for micrometers of high range.

One object of the invention is thus to propose a device for longitudinal measurement, for example a micrometer, which enables the drawbacks of the prior art devices to be overcome or reduced. In particular, an object of the present invention is to propose a micrometer in which no machining of material is necessary to adjust the play between the sleeve and the micrometric screw during assembly.

These objects are achieved, according to the invention, by means of a device for longitudinal measurement, comprising
a sleeve having an at least partially threaded inner surface and an at least partially threaded outer surface, said outer surface comprising at least one deformable tapered portion,
a screw engaged in said sleeve and able to be set in rotation with respect to said sleeve in such a way as to displace itself along the longitudinal measuring axis (x) of the device,
a nut engaged on the threaded portion of said sleeve and able to be put in contact with said tapered portion in such a way as to deform it in order to adjust the play between said screw and said sleeve, wherein said tapered portion is devoid of longitudinal slits and its deformability is provided by an outer diameter variable along its periphery.

In particular these objects are achieved by means of a device for longitudinal measurement in which the sleeve is devoid of longitudinal slits, in particular in its tapered portion. The deformability of the sleeve results from an external diameter variable along its periphery, preferably by means of a plurality of flat parts around its periphery.

This construction brings with it the unexpected advantage of permitting modifications in the diameter of the sleeve without damaging the inner threading and without changing the circular form of the sleeve. The invention thus makes it possible to compensate for the play in the micrometer without detracting from precise functioning of the micrometric screw as in the devices of prior art.

Other advantages of the invention will be more apparent upon reading the description of one example embodiment of the invention illustrated by the figures.

Figure 1:
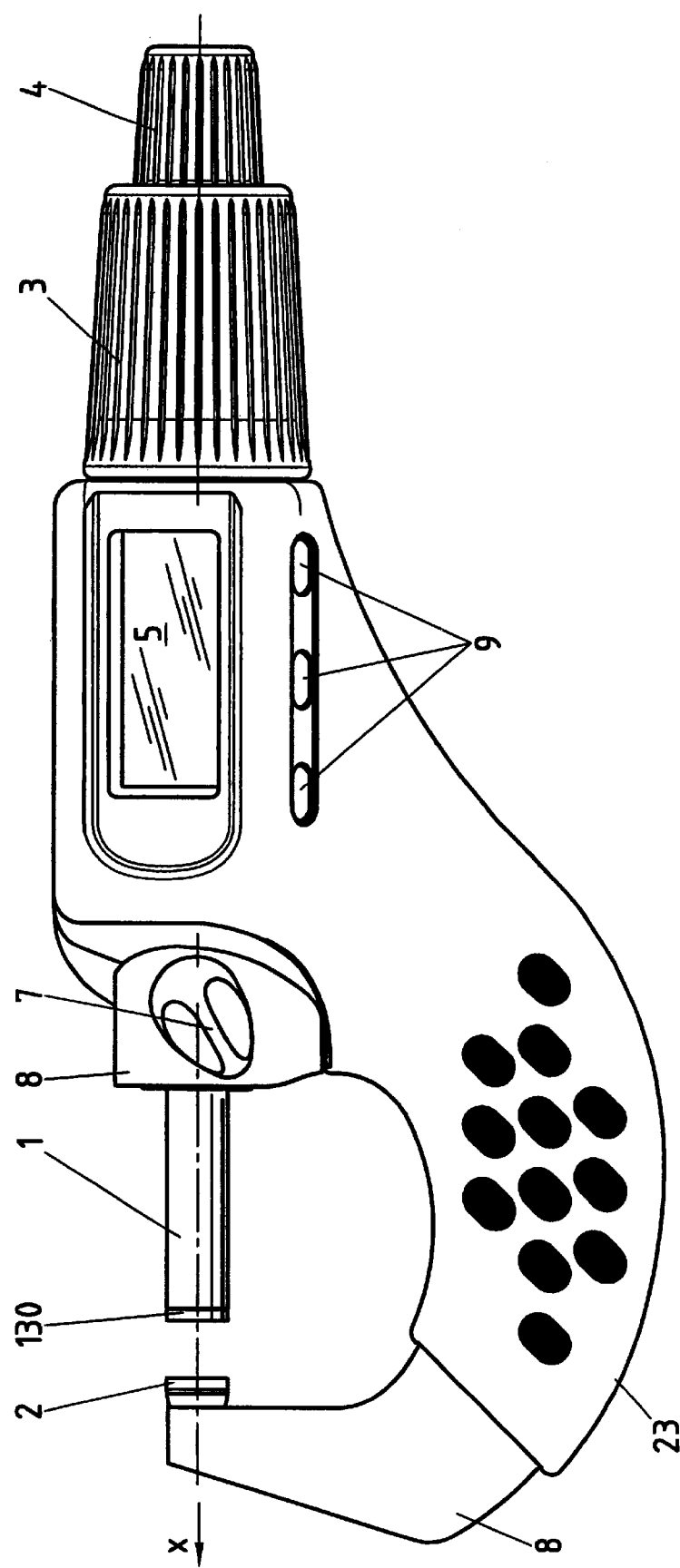
FIG. 1 shows a side view of an electronic micrometer.

FIG. 1 shows a view from the side of an electronic micrometer allowing measurement of the distance between the attached tip 130 of the spindle 1 (integral with the micrometric screw) and the anvil 2, integral with the jaw and the body 8 of the micrometer. The distance measured is displayed on a screen 5, for example a liquid crystal display, the display being controlled by the function keys 9, permitting, for example, the unit of measure to be selected or choosing between the measurement of absolute or relative distances. The screw 1 can be displaced along the longitudinal measuring axis x by turning the thimble 3, or, for a quicker displacement, the fitting on the thimble 4. The displacement of the screw can be blocked in any position by means of the blocking lever 7. The entire device is protected against shocks and against infiltration of water by a casing of synthetic material 23.

Figure 2:
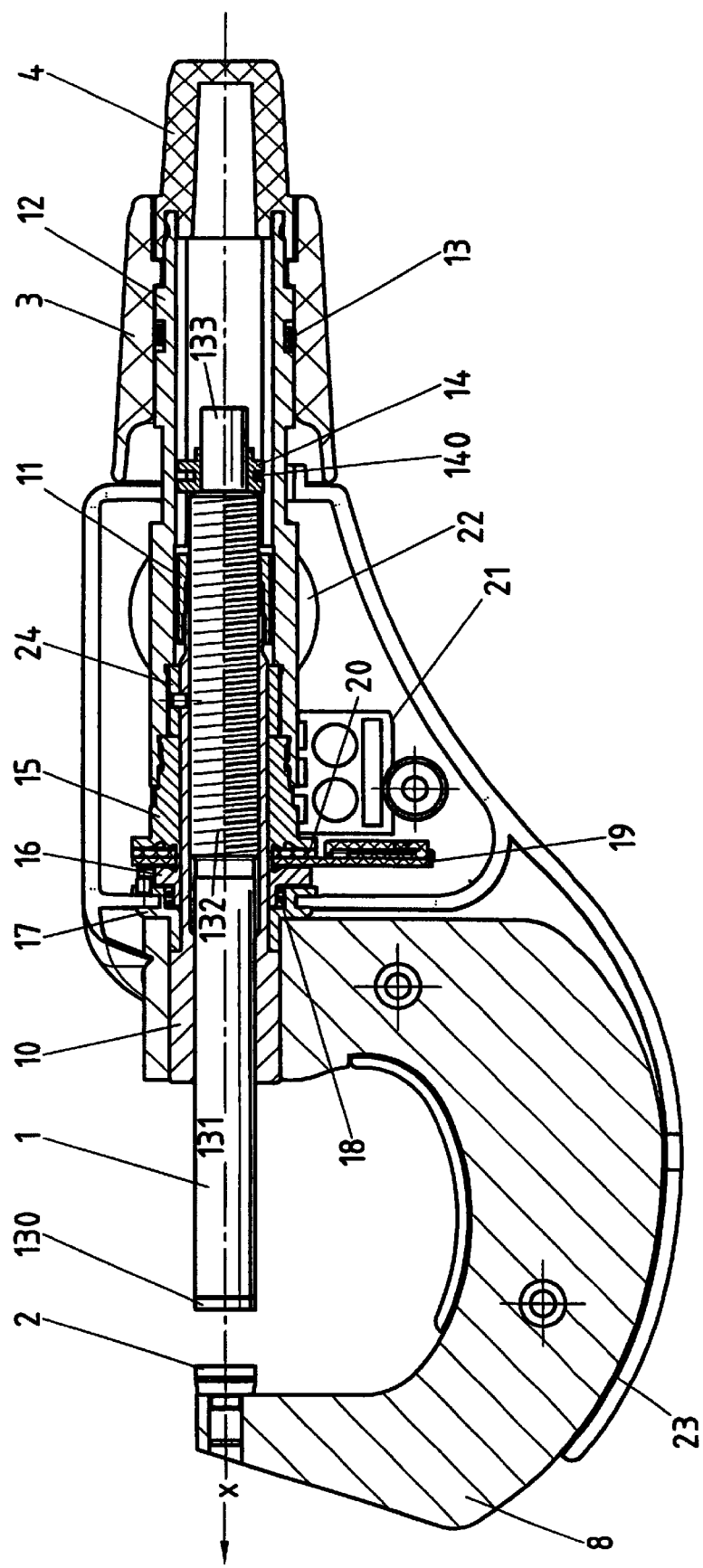
FIG. 2 shows a section of a micrometer according to the invention.

FIG. 2 shows a section of the micrometer of FIG. 1, illustrating in particular the components of the micrometer protected by the synthetic casing 23. In this figure it can be seen that the micrometric screw 1 comprises essentially four functional parts: the attached tip 130, the cylindrical spindle 131 which comes out of the body of the micrometer 8, the threaded portion 132 and the transmission portion 133. The precision of the pitch on the threaded portion is preferably better than 0.001 millimeters, and determines in particular the precision of the micrometer.

The screw 1 can be set in rotation by means of the thimble 3 through the agency of the friction spring 13, the friction ring 12 and the transmission piece 14 mounted on the transmission portion 133. A spring 140 mounted in a peripheral groove about the transmission piece 14 allows the rotation of the friction ring 12 to be transmitted to the screw 1. The friction spring 13 allows the thimble 3 to be decoupled from the screw, in particular at the end of the course or when the end of the spindle is in contact with the piece to be measured, and thus allows a nearly constant measuring pressure to be ensured. However, the screw can also be set in rotation directly by the fitting 4, in particular to ensure a very rapid displacement over long distances. The thimble 3 and the fitting 4 are made preferably of striated synthetic material in order to ensure comfortable contact, a good grip and an aesthetic adapted to the casing 23. In the case of micrometers of large dimensions, a motorized displacement is also conceivable. Other means of transmitting the rotation between the thimble and the screw, including, for example, a ratchet device such as described in particular in the patent application EP-A2-791801, can be used within the framework of this invention.

The threaded portion 132 of the screw 1 is engaged in a threaded sleeve 10, integral with the body 8 of the micrometer. By turning the thimble 3, the screw 1 is thus displaced longitudinally with respect to the threaded sleeve 10. A fixed transducer support 16 is mounted on the threaded sleeve 10 through the agency of an assembly collar 17 and a spring 18, as described in more detail with respect to FIG. 7. A scale support 15, facing the fixed transducer, is set in rotation by the ring 12 upon rotation of the screw 1. The two supports 16, respectively 15, each bear a transducer 19, respectively a scale 20, each provided with a set of capacitive electrodes. The superimposing of the two sets of electrodes determines the angular position of the scale 20 relative to the fixed transducer. An electronic circuit 21, supplied by an autonomous source of electricity, for example by a battery 22, enables feed of the capacitive electrodes and determination of the angular position of the scale 20, starting from the measurement signals received. The electronic circuit 21 is preferably mounted on a flexible printed circuit, facilitating the mounting in a casing of reduced size. By measuring the number of turns carried out by the scale 20 starting from a predetermined position, the electronic circuit 21 thus succeeds in calculating the longitudinal position of the micrometric screw 1 and in displaying this information on the screen 5 or transmitting it to an external device through the serial interface (not shown). Examples of suitable capacitive transducers are described in the patent U.S. Pat. No. 4,578,868. The patent application EP 836076 describes an example for a suitable electronic circuit 21. One skilled in the art will understand that other types of measuring systems, including magnetoresistive, optical or purely mechanical, conventional systems, can be used within the framework of this invention.

Figure 3:
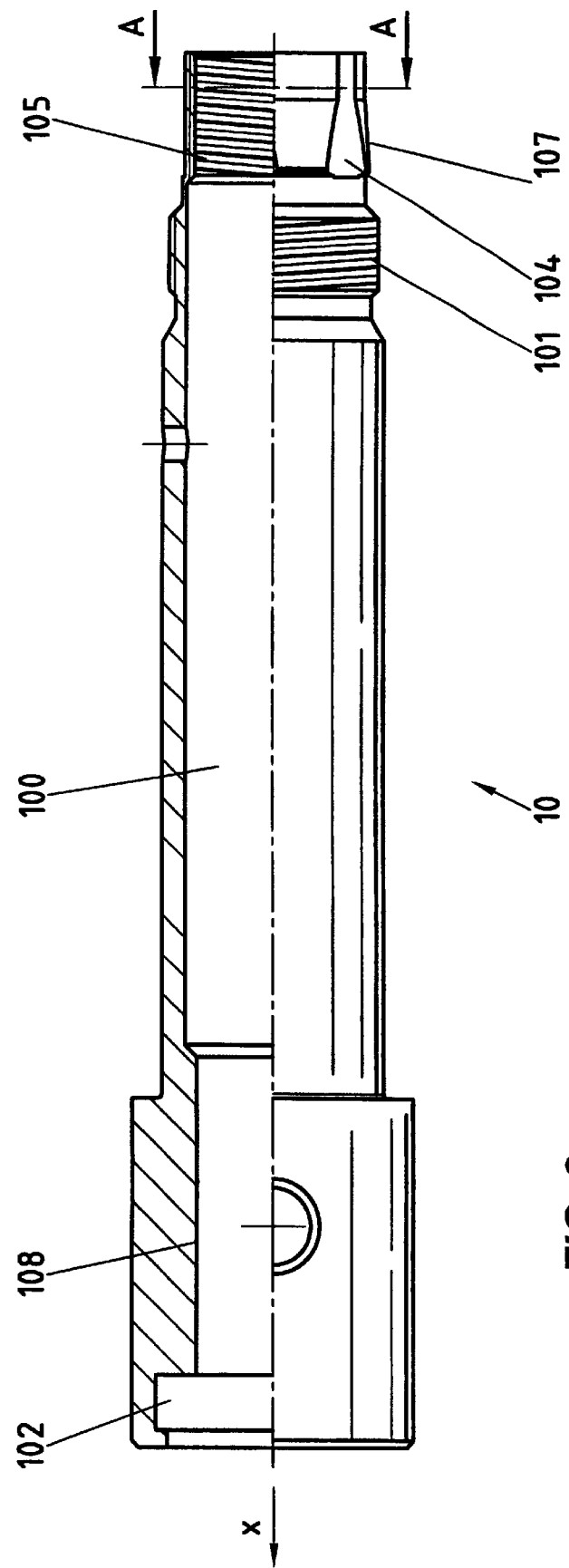
FIG. 3 is a view of the sleeve assembly of the invention, the upper part of the figure being shown in section whereas the lower part is a profile view.

FIG. 3 is a view of the fixed sleeve 10 assembly, the upper part of the figure being shown in section whereas the lower part is a profile view. The sleeve 10 comprises a longitudinal aperture 100 at least one portion of which is provided with a threading 105 able to receive the micrometric screw 1 (not shown in this figure). An annular accommodation 102 is provided at the end in front of this aperture (close to the spindle 130) to receive a joint intended to prevent infiltration of liquid. A non-threaded portion 108, intended to receive the portion of the spindle 130 of the screw 1, is drilled with precision so as to guide the screw while preventing any radial play.

Figure 4:
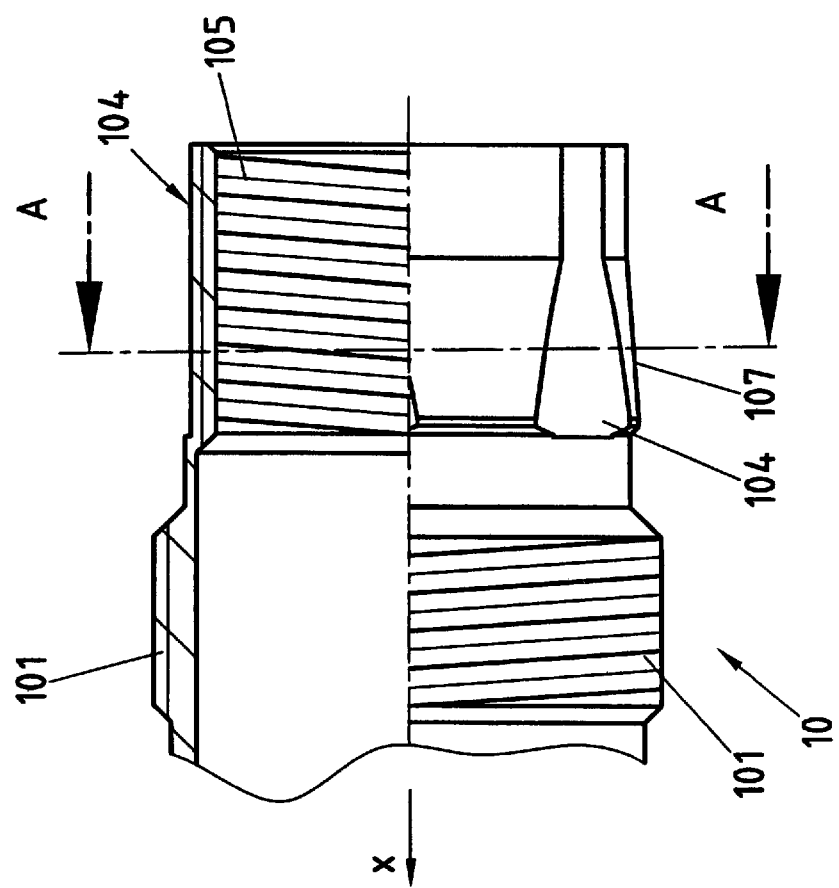
FIG. 4 is an enlarged view of the end of the sleeve of the invention, the upper part of the figure being shown in section whereas the lower part is a profile view.

The rear end of the sleeve 10 is shown enlarged in FIG. 4. The outer surface of this end comprises a tapered portion 107, the diameter of which increases from the rear to the front of the sleeve. An outer threading 101 permits screwing the nut 11, already mentioned, on the exterior of the sleeve in order to adjust the play between the sleeve 10 and the screw 1.

By screwing or unscrewing the nut 11 on the outer threading 101, the position of the point of contact 112 between the nut and the tapered portion 107 is modified so that the play between the sleeve and the screw 1 can be eliminated by adjusting the diameter of the sleeve.

Figure 5:
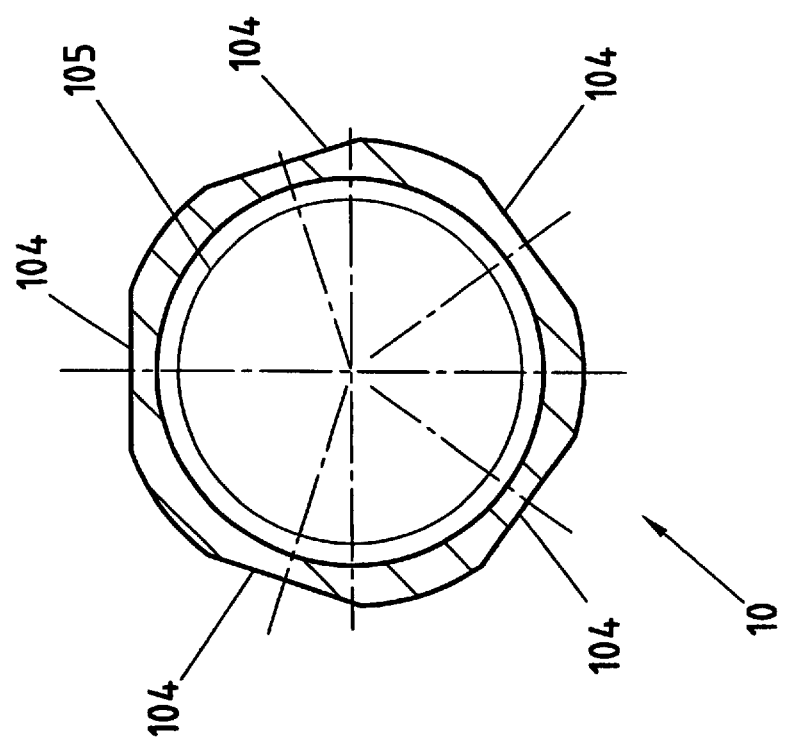
FIG. 5 shows a cross-section along the axis A-A of the sleeve illustrated in FIG. 4.

According to the invention, the tapered portion of the sleeve 10 is devoid of the longitudinal slits known in the prior art devices. The deformability of this portion of the sleeve 10 results from a diameter variable along its outer periphery, i.e. from the fact that if the inner cross-section of this sleeve portion is circular, the outer section is not, as can be seen in particular in the sectional drawing of FIG. 5. In the preferred example illustrated, the outer surface of the tapered portion 107 of the sleeve is provided with flat segments 104, here five segments. The number of segments is not decisive, however, although a number of segments greater than three is preferable to distribute the possible local deformations caused by tightening the nut 11. Moreover it seems that, experimentally, an odd number of flat segments makes possible better limitation of the deformation of the threading 105 and of the circular shape of the aperture 100. The flat segments preferably extend at least over the entire length of the portion of the sleeve 10 provided with the threading 105.

Other shapes for the deformable portion of the sleeve 10 can be adopted within the framework of this invention. It is possible, for example, to provide the entire outer surface with longitudinal grooves, the depth, width and number being extremely variable. The slope of the tapered portion 107 itself can even be accentuated more or less, according to diverse embodiments, it also being possible to adopt a non-linear slope.

Figure 6:
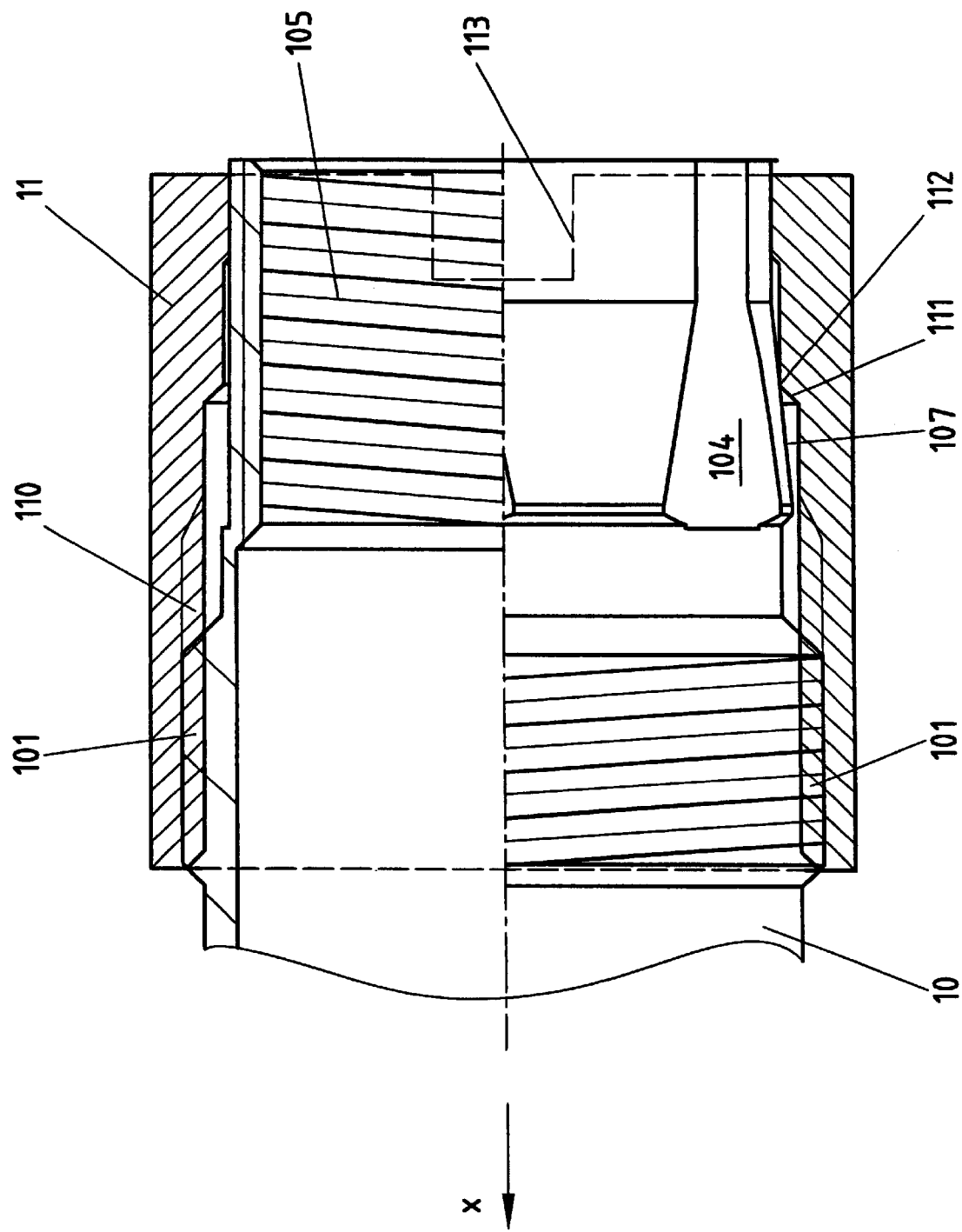
FIG. 6 shows a section of the end of the sleeve of the invention with the adjustment nut mounted.

FIG. 6 shows in section the same portion of the threaded sleeve as FIG. 4, but with the adjustment nut 11 mounted. It can be seen that the adjustment screw is provided with an inner threading 110 able to cooperate with the outer threading 101 of the sleeve 10. According to one feature of the invention, the threaded portion 101 of the sleeve 10 is elongated by the deformable tapered portion so that the stresses on the sleeve are not concentrated in a limited region.

The aperture through the nut 11 comprises a shoulder 111 which comes into contact at a point 112 with the tapered portion of the sleeve 10 when the nut is engaged sufficiently deeply into the outer threading 101. By tightening the nut more, the end of the sleeve 10 is deformed in the zone comprising the flat parts 104, which has the effect of reducing the inner diameter of the sleeve at the level of the threading 105, and thus of adjusting the play between the sleeve and the micrometric screw 1 (not shown in this figure).

The nut 11 can be mounted on the sleeve 10 during assembly. It will be noted that it is not necessary to carry out a new boring and tapping operation owing to very slight deformations in the inner threading and in the circular shape of the sleeve 10, so no machining operation is necessary at the assembly workshops. The tightening of the nut 11 can be adjusted by hand by a skilled worker or adjusted by means of a dynamometric screwing tool engaged in the groove 113 provided for that purpose. The nut 11 entirely covers the external threading 101 of the sleeve 10, in order to protect it.

Figure 7:
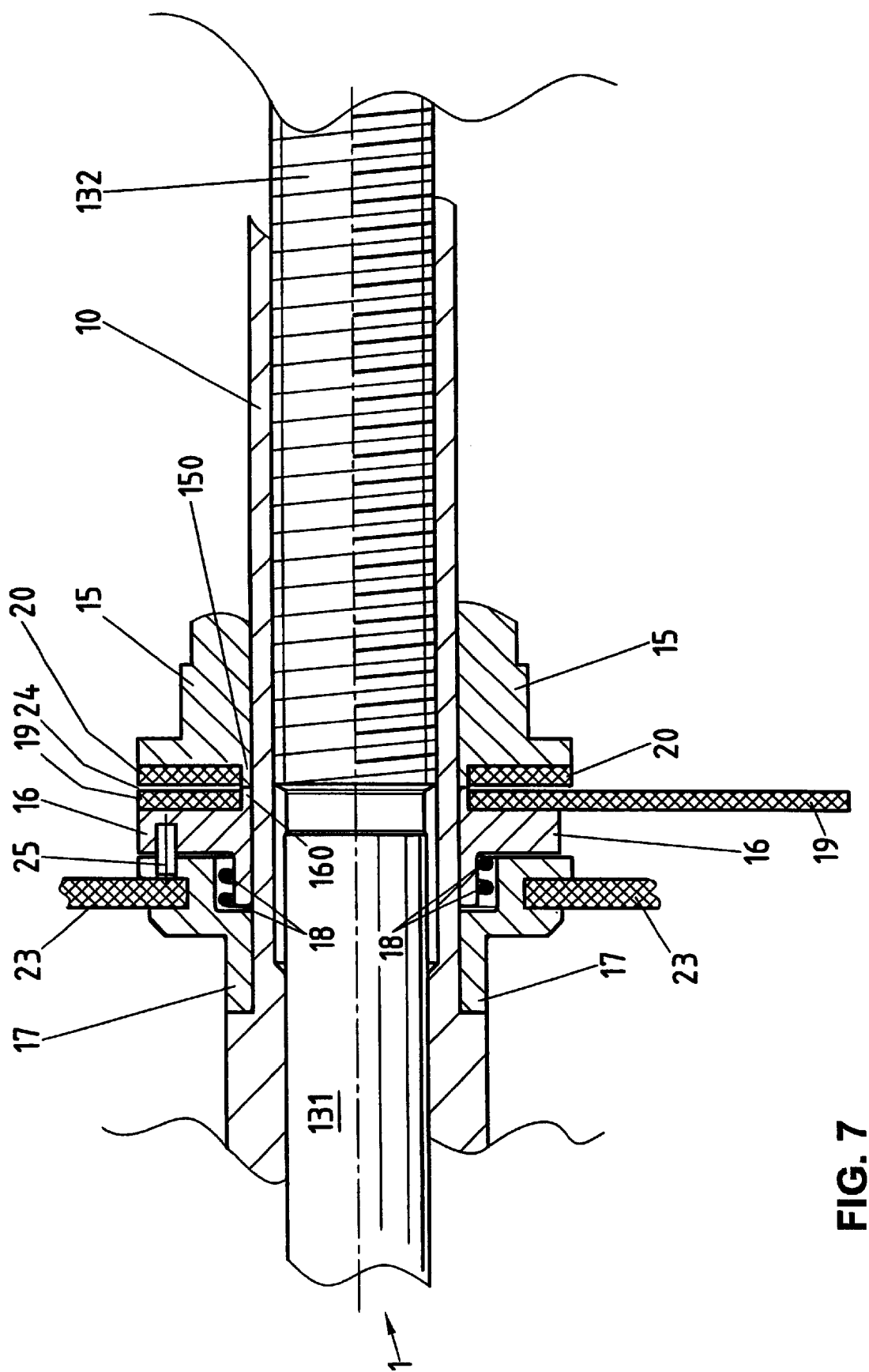
FIG. 7 shows an enlargement of a part of the portion of FIG. 1 showing in particular detail the capacitive measuring system.

FIG. 7 is an enlargement of a portion of FIG. 1 showing more specifically the capacitive measuring system. The measuring system comprises principally a fixed transducer 19 mounted facing a scale 20, driven in rotation with the screw 1. The transducer and the scale each include a set of electrodes (not shown), the two sets of electrodes being separated by a gap 24. The rotating scale is mounted by gluing or crimping, for example, on the support 15; in the same way the fixed transducer 19 is mounted on the transducer support 16.

The gap 24 is provided by a protrusion 160 of the support 16 pressing against a protrusion 150 of the support 15. According to the invention, the longitudinal position of the fixed transducer 19 is not blocked, however; on the contrary, the fixed transducer can displace itself longitudinally along the sleeve 10. The fixed transducer support 16, however, is pressed against the revolving scale support 15 by means of a compressible element, for example an element of caoutchouc, rubber or gum, or as in the preferred example illustrated, a spring 18 supported against the assembly collar 17. The spring allows compensation of the irregularities and imprecision owing to manufacturing tolerances, and improves the precision of measurement by guaranteeing parallelism and spacing between the transducer 19 and the scale 20 independently of, in particular, the angular position of the scale. A pin 25 engaged in an aperture through the assembly collar 17 and the transducer support 16 enables rotation of the latter to be prevented.

One skilled in the art will understand that micrometers of very diverse dimensions can be realized within the framework of this invention as well as other types of devices for longitudinal measurement.

What is claimed is:

1. A device for longitudinal measurement, comprising
   a sleeve having an inner surface being at least partially threaded and an outer surface of said sleeve being at least partially threaded, said outer surface of the sleeve comprising at least one deformable tapered portion,
   a screw engaged in said inner surface of said sleeve, said screw being completely, continuously encircled by said sleeve when set in rotation with respect to said sleeve in such a way as to displace, said screw being displaced along a longitudinal measuring axis (x) of the device,
   a nut engaged on the outer surface of said sleeve and contacting said deformable tapered portion in such a way as to deform said sleeve in order to reduce an inner diameter of said sleeve to eliminate play between said screw and said sleeve,
   wherein said tapered portion is devoid of longitudinal slits and deformability of said sleeve, to reduce the inner diameter of the sleeve, is provided by an outer diameter of said sleeve, varied in diameter along a continuous, integral periphery of said sleeve at said outer surface of said sleeve.

2. The device according to claim 1, wherein said tapered portion comprises flat segments.

3. The device according to the preceding claim, wherein said tapered portion comprises an odd number of flat segments.

4. The device according to claim 1, wherein said tapered portion is devoid of external threading.

5. The device according to claim 1, wherein only a portion of said outer surface able to be completely covered by said nut is provided with said threading.

6. The device according to claim 1, further comprising a transducer and a scale facing said transducer, said scale being set in relative rotation with respect to said transducer upon displacement of said screw so as to determine the position of said screw by the relative position of said transducer and said scale,
   wherein said transducer is maintained longitudinally facing said scale with the aid of a compressible element.

7. The device according to claim 6, wherein said compressible element allows supporting said transducer facing said scale, the spacing being determined by a zone of contact between the supports of said scale and of said transducer.

8. The device according to claim 6, wherein the rotation of said fixed transducer is prevented by an anti-rotation pin.

9. The device according to claim 6, wherein said transducer and said scale are provided with capacitive electrodes, and a circuit is provided allowing the longitudinal position of said screw to be determined starting from the phase shift between said electrodes.

10. The device according to claim 1, wherein it is a micrometer.

* * * * *